United States Patent [19]

Fandrich

[11] Patent Number: 5,022,728
[45] Date of Patent: Jun. 11, 1991

[54] DEVICE COMPOSED OF A LIGHT GUIDE PLATE

[76] Inventor: Heinz-Jürgen Fandrich, Ritterfelddamm 112, D-1000 Berlin 22, Fed. Rep. of Germany

[21] Appl. No.: 490,662

[22] PCT Filed: Sep. 7, 1988

[86] PCT No.: PCT/DE88/00562
 § 371 Date: Mar. 6, 1990
 § 102(e) Date: Mar. 6, 1990

[87] PCT Pub. No.: WO89/02606
 PCT Pub. Date: Mar. 23, 1989

[30] Foreign Application Priority Data

Sep. 9, 1987 [DE] Fed. Rep. of Germany ....... 3730169
Sep. 19, 1987 [DE] Fed. Rep. of Germany ....... 3731577
Sep. 21, 1987 [DE] Fed. Rep. of Germany ....... 3731676
Oct. 27, 1987 [DE] Fed. Rep. of Germany ....... 3736804

[51] Int. Cl.$^5$ .......................... G02B 6/00; F21V 7/04
[52] U.S. Cl. .................................... 350/96.10; 362/32
[58] Field of Search .............. 350/96.10, 96.29, 96.30; 362/32

[56] References Cited

U.S. PATENT DOCUMENTS

| 3,222,515 | 12/1965 | Orr | 350/96.10 |
| 3,491,245 | 1/1970 | Hardesty | 350/96.10 |
| 4,471,412 | 9/1984 | Mori | 362/32 |
| 4,930,863 | 6/1990 | Croitoriu et al. | 350/96.10 X |
| 4,932,749 | 6/1990 | Haidle et al. | 350/96.32 X |

FOREIGN PATENT DOCUMENTS

| 2406168 | 8/1974 | Fed. Rep. of Germany . |
| 2260985 | 8/1979 | Fed. Rep. of Germany . |
| 2942655 | 4/1980 | Fed. Rep. of Germany . |
| 3240942 | 5/1983 | Fed. Rep. of Germany . |

OTHER PUBLICATIONS

Machine Design, Oct. 29, 1959, pp. 98–103.

*Primary Examiner*—Akm Ullah
*Attorney, Agent, or Firm*—Mark P. Stone

[57] ABSTRACT

In a device composed of a light guide plate, the light emitted from a light source is guided by components in a direction parallel to the main surface of the plate and issues from projections (3) formed on the surface of the plate. The smooth surface of the plate is coated with a continuous, transparent, intermediate layer (2) having on one side closely spaced projections (3) with a height and width lying in a range between 0.5 mm and 0.001 mm. The light guide plate thus obtained radiates light uniformly.

20 Claims, 3 Drawing Sheets

DEVICE COMPOSED OF A LIGHT GUIDE PLATE

BACKGROUND OF THE INVENTION

The invention relates to a device composed of a light guide plate, in which light emitted from a light source is guided by components in a direction parallel to the main surfaces of the plate and issues from projections on a surface of the plate.

With a known device of this type (German Offenlegungsschrift 3,240,942), the projections are situated spaced out directly on the plate. No details are given on their size and spacing. For the exemplary embodiments i is assumed that these values are in the centimeter range. The reflection of the light from the surface of the plate is uneven because only the regions of the surface which have projections emit light.

The underlying object of the invention is to develop the known device further in such a way that the resulting density of surface illumination is even to the eye.

According to the invention this object is achieved by the fact that the smooth surface of the plate is coated with a continuous, transparent intermediate layer having on one side closely spaced projections with a height and width lying in a range between 0.5 mm and 0.001 mm.

Since, according to the invention, the sizes and spacing of the light regions in the form of the projections are of such a nature that their upper limits coincide approximately with the lower limit of the resolving power of the human eye (this resolving power is present when the distance between two points is greater than 0.2 mm when the points are located at a distance of 1 m from the eye, see Grimsehl, Lehrbuch der Physik, vol. 3, 1955, page 309), the main surface of the device according to the invention appears to be evenly luminous. The provision of the intermediate layer on the other hand enables the projections to be produced; without the intermediate layer the projections of the type according to the invention could not be created. The lower limit for the sizes of the projections is thus meaningful since smaller projections could hardly, if at all, be manufactured.

SUMMARY OF THE INVENTION

The advantage of the subject of the invention compared with several direct lighting units combined to form a surface-lighting unit lies in its cheaper manufacture, its lower energy consumption and its greater simplicity.

With regard to the projection or the layer, there are possibilities of variation in respect of the form of the projections, the manufacture and the material of the layer. By varying these values, the light can thus be controlled in that the intensity of the issuing light can be controlled along a line on the reflecting surface. For example, it can be achieved that the light issues over the entire surface with equal intensity everywhere, as it can also be achieved that the light in the vicinity of the light feed point is reflected with greater or lesser intensity than in regions at greater distances from the light source. Of course, this also concerns the bunching of the irradiated light or its degree of diffusion. Thus the less intense reflection mentioned can be achieved by the fact that the light is directed substantially parallel to the main surfaces, or also by the fact that the convexity of the projections is correspondingly altered along the line mentioned.

The device according to the invention is simple to manufacture. For example, a layer can be sprayed onto the plate; if the consistency of the material to be sprayed on is appropriate, the projections are formed in the specified shape. However, a foil or second plate can also be pulled onto the plate, which has the said projections on the side facing away from the first plate.

Accordingly, the projections are generally and preferably small elevations, the upper sides of which are generally curved outwards approximately in the shape of a cap, that is to say they are convex. However, they can also be concave, i.e. in the shape of a lens. In the plan view they are largely circular to oval.

It should be mentioned that it is already known (see Machine Design, Oct. 29, 1959, page 96, FIG. 2b), to provide a light guide plate with projections which are closely spaced and the extents of which are less than 0.5 mm in height and width. Nevertheless, in this case, the projections are produced by treating the surface of the plate, namely by sandblasting, scratching and the like. Thus the additional layer is not provided which entails the disadvantage that the light fed into the plate issues again very early. Additionally, the outsides of the projections have edges and surfaces pointing to the side, which is unfavourable for the reflection of light in a forward direction.

The thickness of the plate can fluctuate between broad limits, e.g. it could be a thin foil.

A further development of the device according to the invention, in which the layer is light-transmitting, the projections are arranged on the side facing away from the plate and the layer is thinner in terms of optics than the plate, consists in the fact that a reflector is located opposite the surface at which the light issues, which reflector allows the light to issue from the surface of the plate which is not provided with the layer. This reflector can be placed at a distance from the layer, but it can also be formed by a further layer, situated directly on the layer having the projections, which is in particular thinner in terms of optics than the layer having the projections Of course, this additional layer can also be optically denser than the layer having the projections; in this case some of the beams would pass through this additional layer and some of them would be reflected.

Of course, the feeding of the light into the light guide plate is particularly important. It is expedient for the light to be emitted from a light source preferably arranged opposite a main surface of the plate and to be conducted into the plate by reflection elements and/or refraction elements.

If use is made of refraction elements, several light-transmitting layers should preferably be provided which are arranged parallel or at an angle to the light guide plate and are completely or partially sunk into the latter, and the densities of which decrease in the direction of irradiation. In this case, the light would be curved in stages when passing through the layers and would then penetrate these more or less parallel to the main surfaces of the light guide plate. Of course, it is also possible to provide only one single deflection layer.

If they are reflection elements, it is expedient for these to be formed by at least one mirror surface extending at an angle to the main surfaces of the plate. The mirror surface can be sunk into the plate or placed on top. It is expedient if a piece overlaps the edge at one edge of the plate in the region of the light source, which piece has oblique mirror surfaces running away from the main surfaces of the plate towards the light source.

The mirror surface can also be curved. The mirror surface can be totally reflecting surface or a normal mirror.

BRIEF DESCRIPTION OF THE DRAWINGS

Further details of the invention result from the drawing, in which.

DESCRIPTION OF THE PREFERRED EMBODIMENTS OF THE INVENTION

Figure 1:
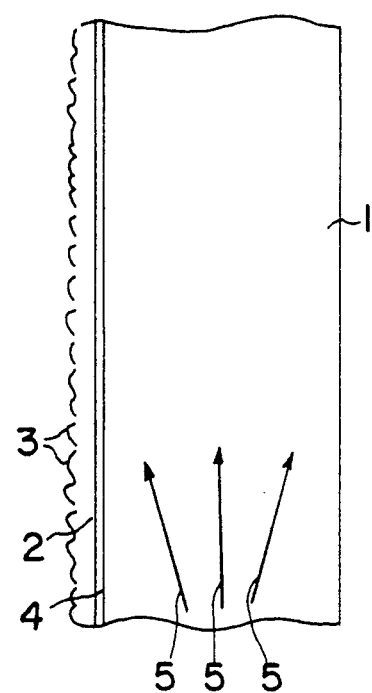
FIG. 1 shows a section through a part of a device according to the invention

In FIG. 1, 1 denotes a light guide plate, 2 denotes a layer which has projections 3 on its left side and 4 denotes an adhesive layer. The light runs through the plate 1, approximately according to the arrows 5.

Figure 2:
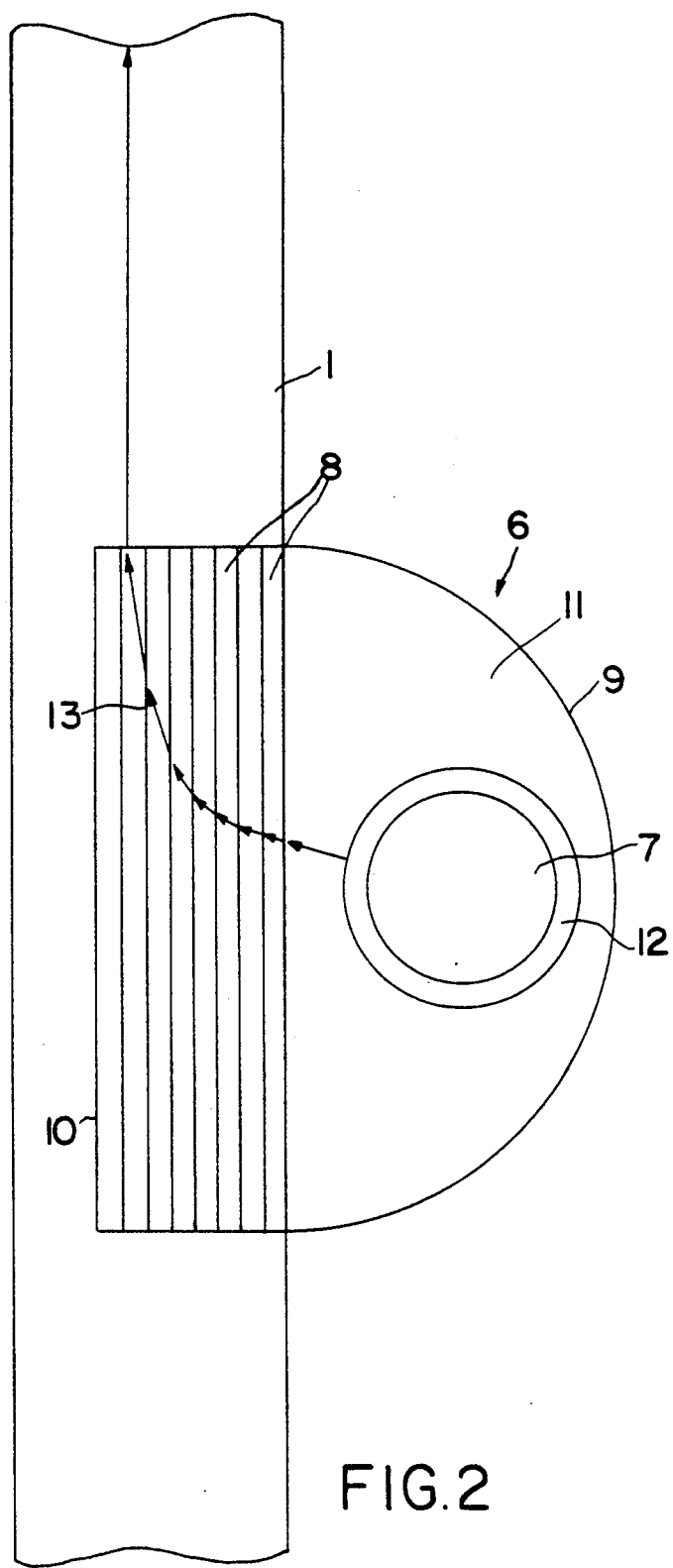
FIG. 2 shows an identical section to that in FIG. 1 with illustration of a first light irradiation element and FIG. 3 likewise snows an identical section with illustration of a second irradiation element.

FIG. 2 again shows the light guide plate 1 and a light irradiation element 6. This consists of a light source, e.g. a tubular lamp 7, several light-transmitting layers 8, a mirror surface 9 and a mirror surface 10. Between the tubular lamp 7 and the foremost layer 8 a light-transmitting layer 11 is also located which has a recess 12, to accommodate the tubular lamp 7. The densities of the layers 8 and of the body 11 are such that the beam of light 13 follows the path illustrated.

Figure 3:
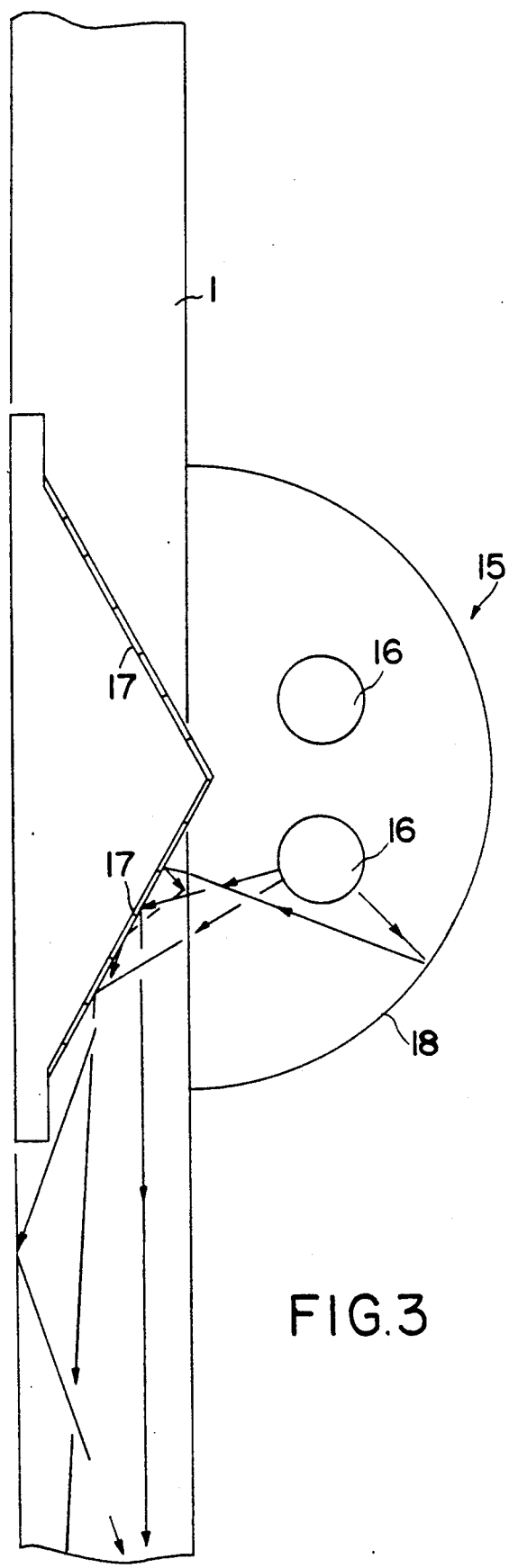

Apart from the light guide plate 1, FIG. 3 shows a different light irradiation element 15. This consists of two tubular lamps 16, roof-shaped reflector 17 and a hollow mirror 18. The path of the beams of light is traced in the lower half of the figure.

Of course, at least one further layer can be provided above the layer 2 (see FIG. 1), which likewise has projections 3. The densities of these layers should be different. In this manner, a further control possibility is created for the light guided into and issuing from the device according to the invention.

Instead of the light guide plate, a body of any shape can, of course, also be provided. For example, the plate does not need to be flat; it can be formed for example into a hollow cylinder which in particular has the layer having the projections in its interior. A body of this kind could serve as an illuminated hand rail of a banister.

Of course, lenses and/or reflectors can also be provided to guide the entering light into the light guide plate in a more intensely bunched form.

I claim:

1. Device composed of a light guide plate in which light emitted from a light source is guided by components in a direction parallel to the main surfaces of the plate and is emitted from said plate through projections (3) extending over a surface of the plate, characterized in that a smooth surface of the plate through which light can be emitted is coated with a continuous, transparent intermediate layer (2), said intermediate layer having on one side thereof closely spaced projections (3), each of said projections having a height and width lying in a range between 0.5 mm and 0.001 mm.

2. Device according to claim 1, characterized in that the intermediate layer (2) is a flexible foil or a rigid plate which bears against the light guide plate (1) without interspace.

3. Device according to claim 2, characterized in that the flexible foil or rigid plate is bonded to the light guide plate.

4. Device according to claim 1 characterized in that the intermediate layer (2) is formed by a spray.

5. Device according to claim 1 characterized in that the height and width of the projections (3) lie between 0.5 mm and 0.01 mm.

6. Device according to claim 1 characterized in that a reflector is located above the projections for allowing light from the light source to be emitted from a surface of the plate not provided with the intermediate layer (2).

7. Device according to claim 6, characterized in that a further layer is located between the reflector and the projections (3), said further layer having a lesser optical density than said intermediate layer (2).

8. Device according to claim 7, characterized in that the reflector and the further layer only cover a portion of the total light guide plate surface (1, 2, 3) on which said further layer is provided such that light is also emitted from edges of the further layer.

9. Device according to claim 8, characterized in that the reflector includes reflective edges that are angularly oriented relative to said main surfaces of said light guide plate.

10. Device according to claim 1 characterized in that each of two opposed main surfaces of the light guide plate are provided with the intermediate layer from which light is emitted.

11. Device according to claim 1, characterized in that crystals made of transparent material are located in at least some of the projections (3).

12. Device according to claim 1 characterized in that the light is emitted from a light source (7; 16) arranged opposite a main surface of the plate and is conducted into the plate (1) by reflection elements or refraction elements (6; 15).

13. Device according to claim 12, characterized in that the refraction elements (6) comprise several light-transmitting layers (8) which are arranged parallel or at an angle to the light guide plate (1) and are completely or partially sunk into the light guide plate, the optical densities of said light transmitting layers decreasing in the direction of radiation.

14. Device according to claim 13 characterized in that the surfaces (9, 10) of the refraction elements through which beams do not have to pass are reflective.

15. Device according to claim 12, characterized in that the reflection elements (15) are formed by at least one mirror surface (17) extending at an angle to the main surfaces of the plate.

16. Device according to claim 15, characterized in that the reflection elements form a cone.

17. Device according to claim 1 characterized in that thin wires are passed through at least the light-emitting surfaces which are earthed or lie on a potential and prevent static electrification.

18. Device according to claim 1 characterized in that at least the light-emitting surface is coated with a thin light-transmitting metallic layer which prevents static electrification.

19. Device according to one of claim 1 to 18, characterized in that light-guiding elements are inserted in the light plate.

20. Device according to claim 19 characterized in that said light-guiding elements are glass fibers.

* * * * *